United States Patent [19]

Clementini et al.

[11] Patent Number: 4,671,986

[45] Date of Patent: Jun. 9, 1987

[54] COMPOSITE PACKING FILM

[75] Inventors: Luciano Clementini; Pierpaolo Camprincoli, both of Terni; Enzo Marcaccioli, Perugia; Alfredo Gemmi, Terni, all of Italy

[73] Assignee: Moplefan S.p.A., Milan, Italy

[21] Appl. No.: 651,762

[22] Filed: Sep. 18, 1984

[30] Foreign Application Priority Data

Oct. 19, 1982 [IT] Italy .............................. 23799 A/82

[51] Int. Cl.$^4$ ........................ B32B 27/08; B32B 27/32
[52] U.S. Cl. .................................. 428/216; 428/476.1; 428/516; 428/518; 428/520
[58] Field of Search ............ 428/516, 518, 216, 476.1, 428/520

[56] References Cited

U.S. PATENT DOCUMENTS

| 3,882,259 | 5/1975 | Nohara et al. | 428/516 X |
| 4,416,944 | 11/1983 | Adur | 428/520 |
| 4,565,738 | 1/1986 | Purdy | 428/516 X |

FOREIGN PATENT DOCUMENTS 2040804A 9/1980 United Kingdom .

Primary Examiner—P. C. Ives
Attorney, Agent, or Firm—Stevens, Davis, Miller & Mosher

[57] ABSTRACT

Composite film for packing comprising an inner supporting layer of a polyolefinic film coated, on one or both faces hereof, with a polyolefin containing free carboxylic acid along the polymeric chain and with a vinyl polymer or with a polyamide.

16 Claims, No Drawings

COMPOSITE PACKING FILM

BACKGROUND OF THE INVENTION

1. Field of the Invention

This invention relates to packing film.

More particularly, the present invention relates to composite films for packing comprising a plurality of film-forming polymer layers, having a high separation resistance between one layer and another and having a low permeability to gases and vapor.

By virtue of these particular properties, the films according to the present invention are particularly suitable for the manufacture of containers, envelopes, bags, vessels and manufactured articles in general, which are chiefly intended for the packing industry.

2. Description of the Prior Art

As is known, materials to be used for packing desirably possess a combination of mechanical and aesthetic characteristics, including non-permeability, thermoweldability and other characteristics, which are rarely simultaneously found in films prepared from only one type of polymer.

For this reason, bonded articles or laminated articles obtained from a combination of more than one film of different materials, or lacquered films are generally utilized.

Thus, for example, there are known bonded articles and laminated articles manufactured from polyolefinic films with films of other thermoplastic polymers and/or with metal sheets, such as aluminum sheets.

There are also known bonded articles prepared from polypropylene oriented films with non-oriented films obtained from mixtures of polypropylene with polyethylene or of crystalline ethylene-propylene copolymers.

The lacquered films are obtained by applying onto a base or supporting film one or more layers of different polymers.

The main drawback encountered in preparing these bonded, laminated or lacquered films is the inconsistency or low adhesion of the different polymers or copolymers which the various layers are made from.

As is known, in order to overcome this drawback, use is made of adhesives interposed between the various layers, and of surface treatments, such as electric discharges, chemical oxidation, and flame treatments, carried out prior to bonding or to lacquering.

SUMMARY OF THE INVENTION

It is an aim of the present invention to provide composite packing films of particular polymers or copolymers compatible with one another and with the polymer constituting the supporting layer, and bonding of which can be accomplished without having recourse to the use of adhesives or to treatments for modifying the film surfaces.

The present invention provides a composite packing film comprising an inner supporting layer of a polyolefinic film coated, on one or both faces thereof, with an olefinic polymer or copolymer containing free carboxylic groups along the polymeric chain and with a vinyl polymer or with a polyamide.

The inner supporting layer of the composite film of the present invention is preferably a bi-stretched, mono-stretched or non-stretched film prepared from a polymer or a copolymer of an alpha-olefin. Although any polymer or copolymer of an alpha-olefin may be employed, in practice it is preferable to use polypropylene essentially consisting of isotactic macromolecules and obtained by stereospecific polymerization of propylene. Polypropylene is employable either alone or in admixture with polyethylene or with crystalline propylene/ethylene copolymers having a predominant propylene content, of both the random and the block type.

The olefinic polymer or copolymer containing free carboxylic groups arranged along the polymeric chain may be obtained by grafting an unsaturated acid on the olefinic polymer or copolymer, in the presence of an organic peroxide. As an olefinic polymer or copolymer, polypropylene essentially consisting of isotactic macromolecules and crystalline propylene/ethylene copolymers predominantly containing propylene of both the random type and the block type may be preferably used. The unsaturated carboxylic acid to be grafted onto the polymeric chain may be suitably acrylic acid, methacrylic acid, maleic acid, fumaric acid, crotonic acid, itaconic acid and derivatives thereof, acrylic acid and methacrylic acid being preferred. The organic peroxide employed to accomplish the grafting may be suitably dicumyl peroxide; ter.butyl-benzoate peroxide; $\alpha,\alpha'$-bis-(ter.butylperoxy)-di-isopropyl-benzene; benzoyl-peroxide; or lauroyl peroxide.

According to a preferred process, the olefinic polymer or copolymer containing free carboxylic groups along the polymeric chain is obtainable by first subjecting the olefinic polymer to peroxidation and by successively treating the peroxidized polymer with an unsaturated acid at 180°–200° C. and in the presence of an organic peroxide having an average life of less than or equal to 30 seconds, or by a process in an aqueous suspension at 40°–130° C.

The thickness of the coating prepared from the olefinic polymer or copolymer containing free carboxylic groups along the chain may suitably vary from 10 to 100 microns.

To the supporting layer, coated with a film made from an olefinic polymer or copolymer containing free carboxylic groups, there is successively applied an external coating of a vinyl polymer or of a polyamide. Suitable vinyl polymers are polyethylene, crystalline propylene/ethylene copolymers having a predominant propylene content, ethylene/unsaturated ester copolymers such as the ethylene/vinyl acetate copolymers, and ethylene/unsaturated alcohol copolymers such as the ethylene/vinyl alcohol copolymers. Suitable polyamides are nylon 6,6 (polyhexamethylene-adipamide); nylon 6 (polycaprolactam); nylon 4; and nylon 6,10.

The thickness of the external coating may vary from 10 to 100 microns, depending on the properties to be obtained.

The composite films of the present invention are preparable by co-extrusion of the various polymers or copolymers, by lacquering, by extrusion coating, or by lamination of the films with one another, without the use of adhesives, by causing them to pass between rollers heated at 50°–200° C.

The resulting composite films can be subjected to stretching, either in two directions or in one direction, depending on whether the supporting layer has been previously subjected to stretching or has been subjected to stretching in one direction only.

The composite films of the present invention, obtained without employing interposed adhesives or surface treatments, such as electric discharge, chemical oxidation or flame treatment, exhibit high mechanical properties, a high separation resistance of the films which constitute the various layers, and low permeability to gases and vapors.

The invention will be further described with reference to the following illustrative examples.

In the following examples, evaluation of the characteristics of the composite films of the present invention is effected according to the following:
separation or stripping resistance between supporting film and coating, measured according to ASTM D 903/65;
permeability to oxygen measured at 25° C. according to ASTM D 1434

EXAMPLE 1

By co-extrusion, a composite film was prepared which comprised, as an inner supporting layer, polypropylene predominantly consisting of isotactic macromolecules, prepared by stereospecific polymerization of propylene and having a melt index of 1.5, a residue to extraction with heptane of 98.4% and an ash content of 75 ppm, and, as an outer coating layer, polypropylene having the same characteristics as specified hereinabove, grafted with acrylic acid having a free —COOH content of 0.31% by weight of a melt index of 7.5. The ratio between the thickness of the supporting layer and that of the coating layer was equal to 10:1.

The film so obtained was hardened on rollers at 40° C. and longitudinally stretched at 140° C. according to a stretch ratio of 1:5. Onto a face of the resulting film stretched in one direction, a polycaprolactam film having a softening temperature of 215° C. was extruded. The ratio between the thickness of the supporting layer and the thickness of the external coating of polycaprolactam was equal to 1:0.2.

The composite film so obtained was subjected to transverse stretching at 155° C. with a stretch ratio of 1:8.

The composite bi-stretched film so obtained exhibited the following characteristics:
total thickness: 30 microns
tensile strength:
　transverse: 2900 kg/cm$^2$
　longitudinal: 1500 kg/cm$^2$
elongation:
　transverse: 40%
　longitudinal: 120%
resistance to separation between co-extruded supporting film and coating: 2.9 kg/cm
permeability to oxygen: 25 cm$^3$/m$^2$.24 h.atm.

EXAMPLE 2

By following the procedure according to example 1, a composite film of polypropylene-polypropylene grafted with acrylic acid was prepared.

The resulting film, after hardening on rollers at 40° C. and longitudinal stretching at 140° C. according to a stretching ratio of 1:5, was extrusion-coated with an ethylene/vinyl acetate copolymer layer having a softening temperature of 110° C. The ratio between the thickness of the supporting film and that of the coating film was 1:0.2.

The characteristics of the coated film so obtained, after transverse stretching at 155° C. according to a stretch ratio of 1:8, were as follows:
total thickness: 30 microns
tensile strength:
　transverse: 2700 kg/cm$^2$
　longitudinal: 1450 kg/cm$^2$
elongation:
　transverse: 45%
　longitudinal: 135%
resistance to separation between co-extruded supporting film and coating: 1.8 kg/cm
permeability to oxygen: 50 cm$^3$/m$^2$.24 h.atm.

EXAMPLE 3

By following the procedure according to example 1, a film was prepared by co-extruding polypropylene predominantly consisting of isotactic macromolecules, prepared by stereospecific polymerization of propylene and having a melt index of 1.5, an ash content of 75 ppm and a residue to extraction with heptane of 98.4%, and polypropylene having the characteristics mentioned hereinabove, grafted with acrylic acid to yield a content of free carboxylic groups of 1.25% by weight and a melt index of 12. The ratio between the thickness of the supporting film and the thickness of the coating was equal to 10:1.

A face of the film so obtained, after hardening on rollers heated at 40° C. and stretching in the longitudinal direction at 140° C. according to a stretching ratio of 1:5, was extrusion-coated with an ethylene/vinyl alcohol copolymer having a softening temperature equal to 180° C. The resulting coated film, having a thickness ratio of co-extruded supporting layer to coating of 1:0.2, after transverse stretching at 155° C. according to a stretch ratio of 1:8, exhibited the following characteristics:
total thickness: 30 microns
tensile strength:
　transverse: 2800 kg/cm$^2$
　longitudinal: 1300 kg/cm$^2$
elongation:
　transverse: 50%
　longitudinal: 110%
resistance to separation between co-extruded supporting film and coating: 2.8 kg/cm
permeability to oxygen: 15 cm$^3$/m$^2$.24 h.atm.

EXAMPLE 4

Example 3 was repeated, but instead of the outer coating of ethylene/vinyl alcohol copolymer there was applied low density polyethylene having a softening temperature of 110° C.

The coated film so obtained exhibited the following characteristics:
total thickness: 30 microns
tensile strength:
　transverse: 2750 kg/cm$^2$
　longitudinal: 1350 kg/cm$^2$
elongation:
　transverse: 40%
　longitudinal: 130%
resistance to separation between co-extruded supporting film and coating: 0.8 kg/cm
permeability to oxygen: 1300 cm$^3$/m$^2$.24 h.atm.

EXAMPLE 5

A bonded film was prepared by causing to pass between rollers heated at 220° C.:

(A) a film having a thickness of 50 microns, obtained by co-extruding polypropylene predominantly consisting of isotactic macromolecules, prepared by stereospecific polymerization of propylene and having a melt index equal to 1.5, a residue to extraction with heptane equal to 98.4% and an ash content of 75 ppm, and polypropylene having the same properties as specified hereinabove, grafted with acrylic acid, having a content of acid groups —COOH equal to 0.35% by weight and a melt index of 7.5, and stretched both longitudinally and transversally, according to the operative conditions of example 1; and (B) a polycaprolactam film of 50 micron thickness, having a longitudinal tensile strength of 800 kg/cm² and an elongation of 300%.

The characteristics of the resulting bonded film were the following:
total thickness: 100 microns
tensile strength:
  transverse: 1100 kg/cm²
  longitudinal: 750 kg/cm²
elongation:
  transverse: 110%
  longitudinal: 230%
resistance to separation between film A and film B: 2.5 kg/cm
permeability to oxygen: 18 cm³/m².24 h.atm.

EXAMPLES 6 TO 8

By causing to pass between two rollers heated to 180° C. film A of example 5, respectively with (C) a film of an ethylene/vinyl acetate copolymer having a thickness of 50 microns, a longitudinal tensile strength of 300 kg/cm² and an elongation of 550%;

(D) a film of an ethylene/vinyl alcohol copolymer having a thickness of 50 microns, a longitudinal tensile strength of 400 kg/cm² and an elongation of 250%, or (E) a film of polyethylene having a thickness of 50 microns, a longitudinal tensile strength of 200 kg/cm² and an elongation of 400% bonded films were obtained having the following characteristics:

|  | Bonded film A-C | Bonded film A-D | Bonded film A-E |
|---|---|---|---|
| Total thickness, microns | 100 | 100 | 100 |
| Tensile strength, kg/cm² | | | |
| transverse | 1050 | 950 | 1200 |
| longitudinal | 700 | 600 | 900 |
| Elongation, | | | |
| transverse | 105 | 160 | 120 |
| longitudinal | 220 | 220 | 240 |
| Resistance to separation between the two films, kg/cm | 1.6 | 2.4 | 0.6 |
| Permeability to oxygen, cm³/m² · 24 h · atm. | 45 | 15 | 1200 |

What we claim is:

1. A composite packing film consisting of an inner supporting layer of a polyolefinic film coated, on at least one face thereof, with a layer of an olefinic (co)polymer grafted with an unsaturated acid and containing free carboxylic groups along the polymeric chain and with an external coating of a polymer selected from the group consisting of a vinyl polymer and a polyamide.

2. A composite film as claimed in claim 1, in which the inner supporting film is a bi-stretched film.

3. A composite film as claimed in claim 1, in which the inner supporting film is a mono-stretched film.

4. A composite film as claimed in claim 1, in which the inner supporting film is a non-stretched film.

5. A composite film as claimed in claim 1, in which the polyolefinic film is made of polypropylene consisting essentially of isotactic macromolecules and obtained by stereospecific polymerization of propylene.

6. A composite film as claimed in claim 5, in which polypropylene is employed in admixture with polyethylene.

7. A composite film as claimed in claim 5, in which polypropylene is employed in admixture with a crystalline propylene/ethylene copolymer having a predominant propylene content, of both the random and the block type.

8. A composite film as claimed in claim 1, in which the unsaturated acid is selected from acrylic acid, methacrylic acid, maleic acid, fumaric acid, crotonic acid and itaconic acid.

9. A composite film as claimed in claim 1, in which the thickness of the coating with the olefinic (co)polymer containing free carboxylic groups along the chain is from 10 to 100 microns.

10. A composite film as claimed in claim 1, in which the vinyl polymer is selected from polyethylene, crystalline propylene/ethylene copolymers having a predominant propylene content, ethylene/unsaturated ester copolymers, and ethylene/unsaturated alcohol copolymers.

11. A composite film as claimed in claim 11, in which the ethylene/unsaturated ester copolymers are ethylene/vinyl acetate copolymers.

12. A composite film as claimed in claim 11, in which the ethylene/unsaturated alcohol copolymers are ethylene/vinyl alcohol copolymers.

13. A composite film as claimed in claim 1, in which the polyamide is selected from nylon 6,6; nylon 6; nylon 4 and nylon 6,10.

14. A composite film as claimed in claim 1, in which the thickness of the coating with a vinyl polymer is from 10 to 100 microns.

15. A composite film as claimed in claim 1, in which the thickness of the coating with a polyamide is from 10 to 100 microns.

16. A composite film as claimed in claim 1, in which both faces of the inner supporting layer of a polyolefinic film are coated with an olefinic (co)polymer containing free carboxylic groups along the polymeric chain and with a polymer selected from the group consisting of a vinyl polymer and a polyamide.

* * * * *